Patented Sept. 13, 1938

2,129,964

UNITED STATES PATENT OFFICE 2,129,964

AZO DYESTUFFS

Hans Roos, Leverkusen-I. G.-Werk, Germany, assignor to General Aniline Works, Inc., New York, N. Y., a corporation of Delaware No Drawing. Application June 5, 1935, Serial No. 25,179. In Germany June 21, 1934

3 Claims. (Cl. 260—160)

The present invention relates to new substantive azo dyestuffs.

I have found that new and valuble cotton dyestuffs can be obtained by combining 1-aminoaryl-5-pyrazolone-3-carboxylic acids which may bear any substituents in the aryl nucleus, such as halogen, alkyl, alkoxy, the sulfonic acid group, the carboxylic acid group, and the like, with the diazo compounds obtainable from the aminobenzoylamino compounds including the aminobenzoyl-amino-benzoylamino compounds derived from diamino diphenylurea sulfonic acids, diamino stilbene sulfonic acids and dehydrothiotoluidine and its homologues, such as dehydrothioxylidine.

As diazotization components suitable for the purpose of the present invention there are mentioned by way of example di- (o-, m-, or p-aminobenzoyl)-diaminodiphenylureadisulfonic acid, di-(aminobenzoylaminobenzoyl) - diaminodiphenylureadisulfonic acid.

My new dyestuffs are in form of their alkali metal salts generally yellow to orange powders dyeing the vegetable fiber generally yellow to orange shades.

The dyeings obtained with my new dyestuffs can be after-treated with formaldehyde in the usual manner, whereby their fastness to washing is considerably improved. Further the new dyestuffs can be diazotized in substance or on the fiber and developed with the usual developers.

Compared with the known dyestuffs which are distinguished from my new dyestuffs by containing as coupling component 1-aminophenyl-3-methyl-5-pyrazolone instead of a 1-aryl-5-pyrazolone-3-carboxylic acid the new dyestuffs yield somewhat more reddish shades of an improved dischargeability both with a neutral and alkaline discharge paste.

The invention is illustrated by the following examples, without being limited thereto:

*Example 1.*—64 grams of 4,4'-(di-p-aminobenzoyl)-aminophenylurea - 3,3' - disulfonic acid are dissolved in 2 litres of water and 11 grams of sodium carbonate, 13.8 grams of sodium nitrite are added thereto, and the solution is poured into a mixture of 56 ccs. of 10-N hydrochloric acid, some water and ice. The diazotization is soon complete, and the mixture is introduced into a solution of 50 grams of 1-m-nitrophenyl-5-pyrazolone-3-carboxylic acid containing 56 grams of sodium carbonate. The formation of the dyestuff proceeds quickly, the dyestuff formed is reduced with sodium sulfide at 70–80° C. and after this isolated in the usual manner and dried. In its free state it corresponds to the following formula:

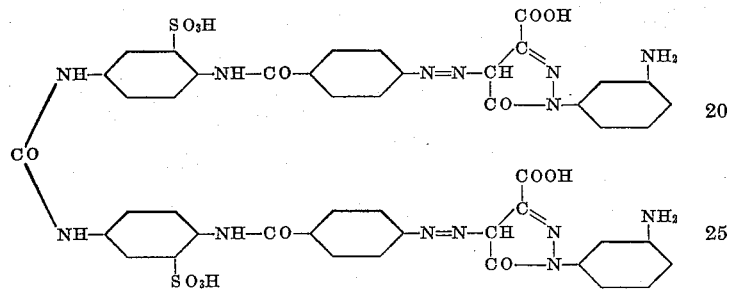

it dyes cotton a reddish yellow which can be discharged to a pure white both with a neutral and an alkaline reacting discharge paste. When diazotized and developed with 1-phenyl-3-methyl-5-pyrazolone, a yellow fast to washing, with β-naphthol an orange fast to washing is obtained. It may be mentioned that the non-diazotized dyeings can be aftertreated with formaldehyde, whereby the fastness to washing is remarkably improved without unfavorably influencing the dischargeability.

I claim:

1. Azodyestuffs after the general formula

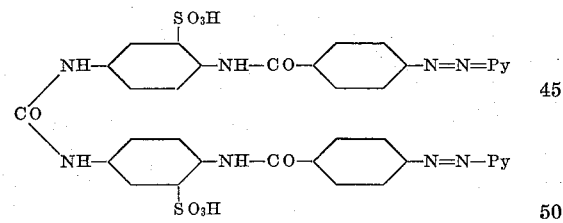

wherein Py stands for the radical of a 1-meta-aminophenyl - 5 - pyrazolone - 3 - carboxylic acid, dyeing the vegetable fiber yellow shades which can be discharged to a pure white both with a neutral and an alkaline reacting discharge paste.

2. The dyestuff having in the free state the following formula:

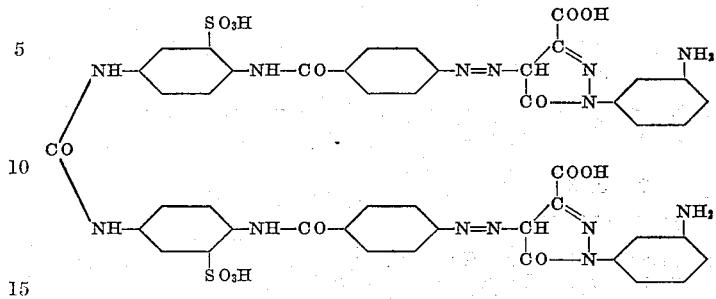

dyeing cotton reddish yellow shades which, when diazotized on the fiber and developed with 1-phenyl - 3 - methyl - 5 - pyrazolone, yield yellow shades fast to washing.

3. Disazodyestuffs of the formula

wherein

stands for a radical of an aminobenzoyl compound of the group consisting of aminobenzoyl diaminodiphenylurea sulphonic acids and aminobenzoyl diaminostilbene sulphonic acids, and R' means 1-meta-aminophenyl- 5 -pyrazolone - 3 - carboxylic acid, dyeing the vegetable fiber generally yellow to orange shades which can be aftertreated with formaldehyde or diazotized and developed.

HANS ROOS.